Oct. 30, 1934. L. G. CASEY 1,979,140
CUTTING-OFF MACHINE
Filed Dec. 7, 1931 4 Sheets-Sheet 1

INVENTOR
Ledgeworth G. Casey
BY
ATTORNEY

Oct. 30, 1934.  L. G. CASEY  1,979,140
CUTTING-OFF MACHINE
Filed Dec. 7, 1931  4 Sheets-Sheet 3
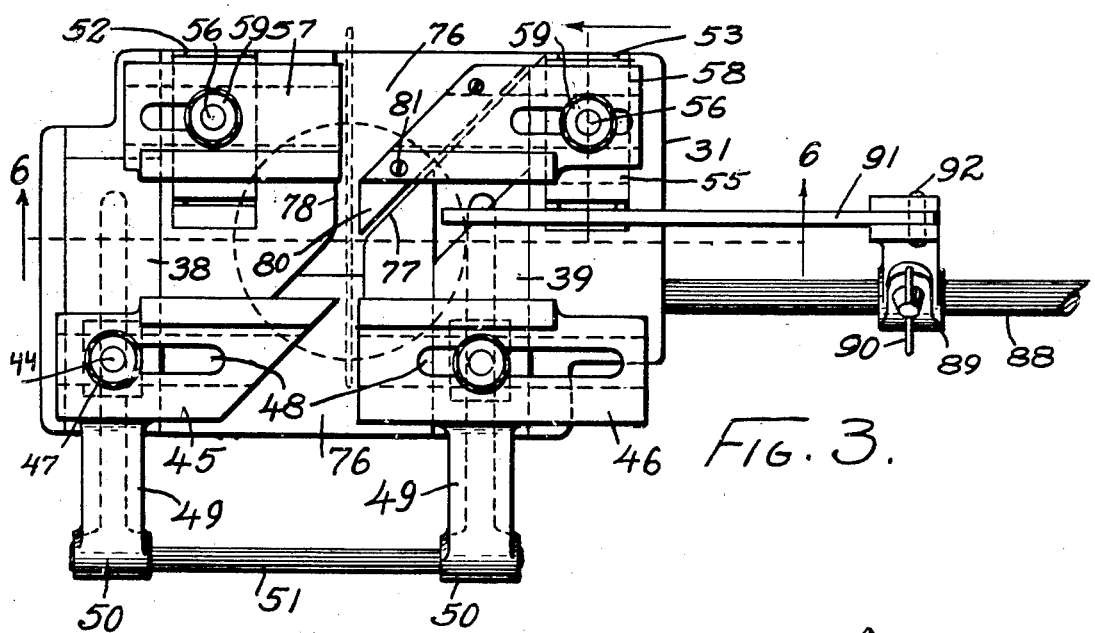
Fig. 3.
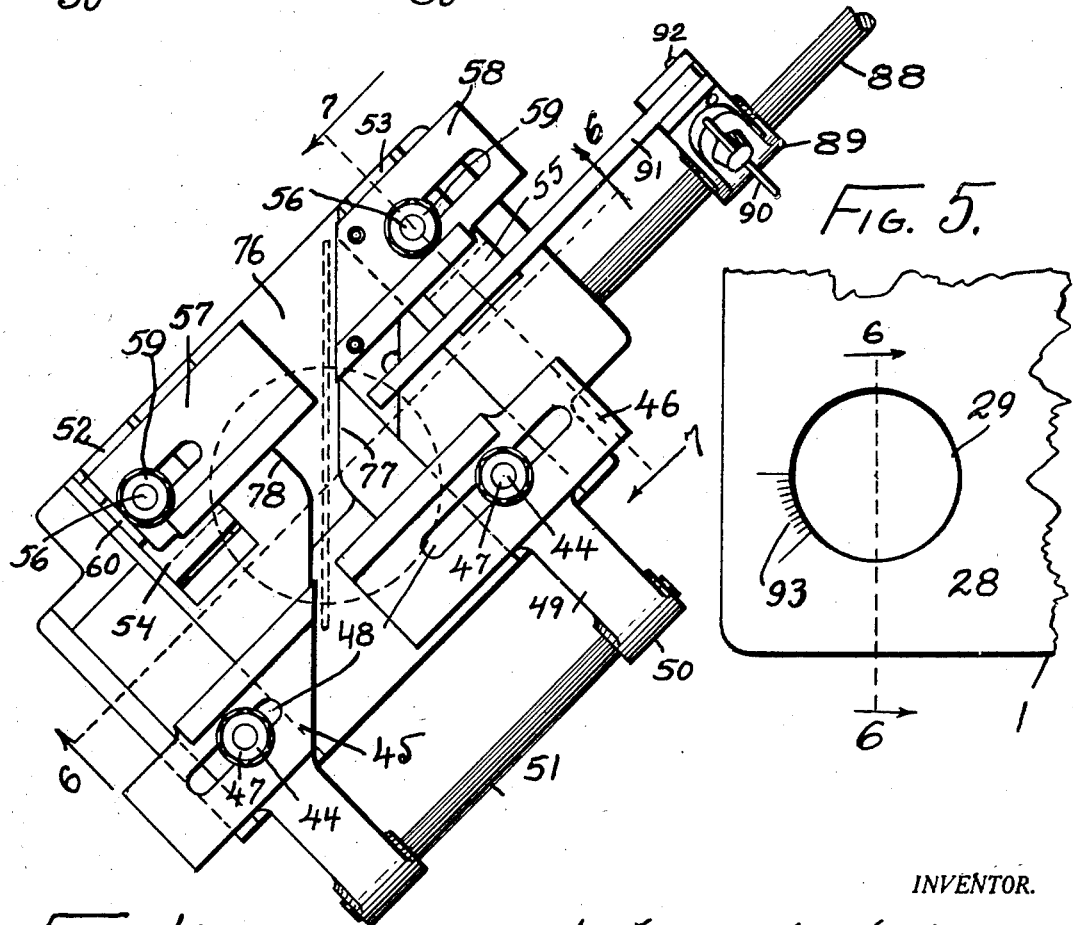
Fig. 4.
Fig. 5.
INVENTOR.
Ledgeworth G. Casey
BY
ATTORNEY.

Oct. 30, 1934.  L. G. CASEY  1,979,140
CUTTING-OFF MACHINE
Filed Dec. 7, 1931   4 Sheets-Sheet 4
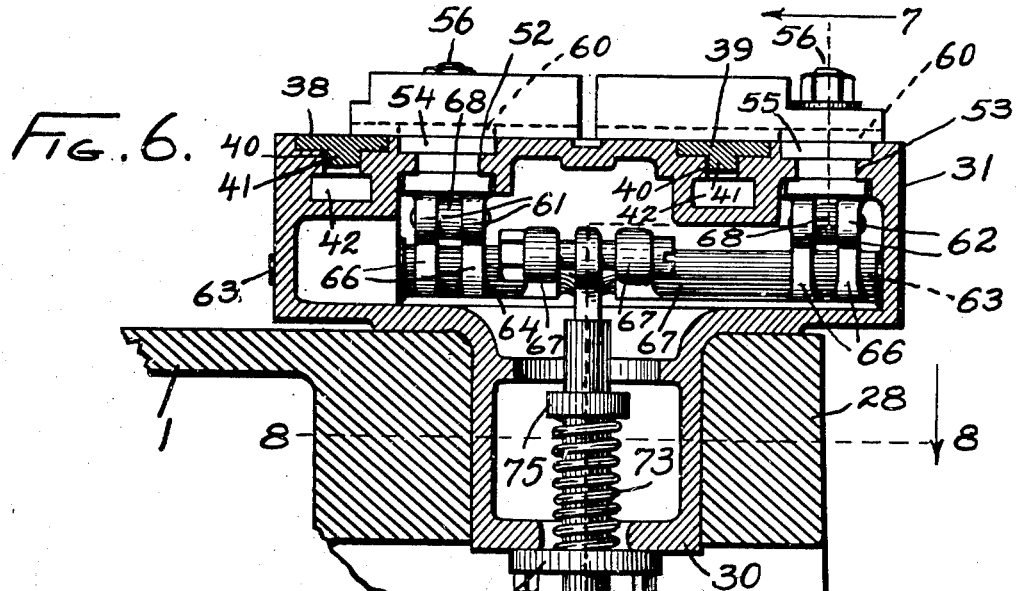
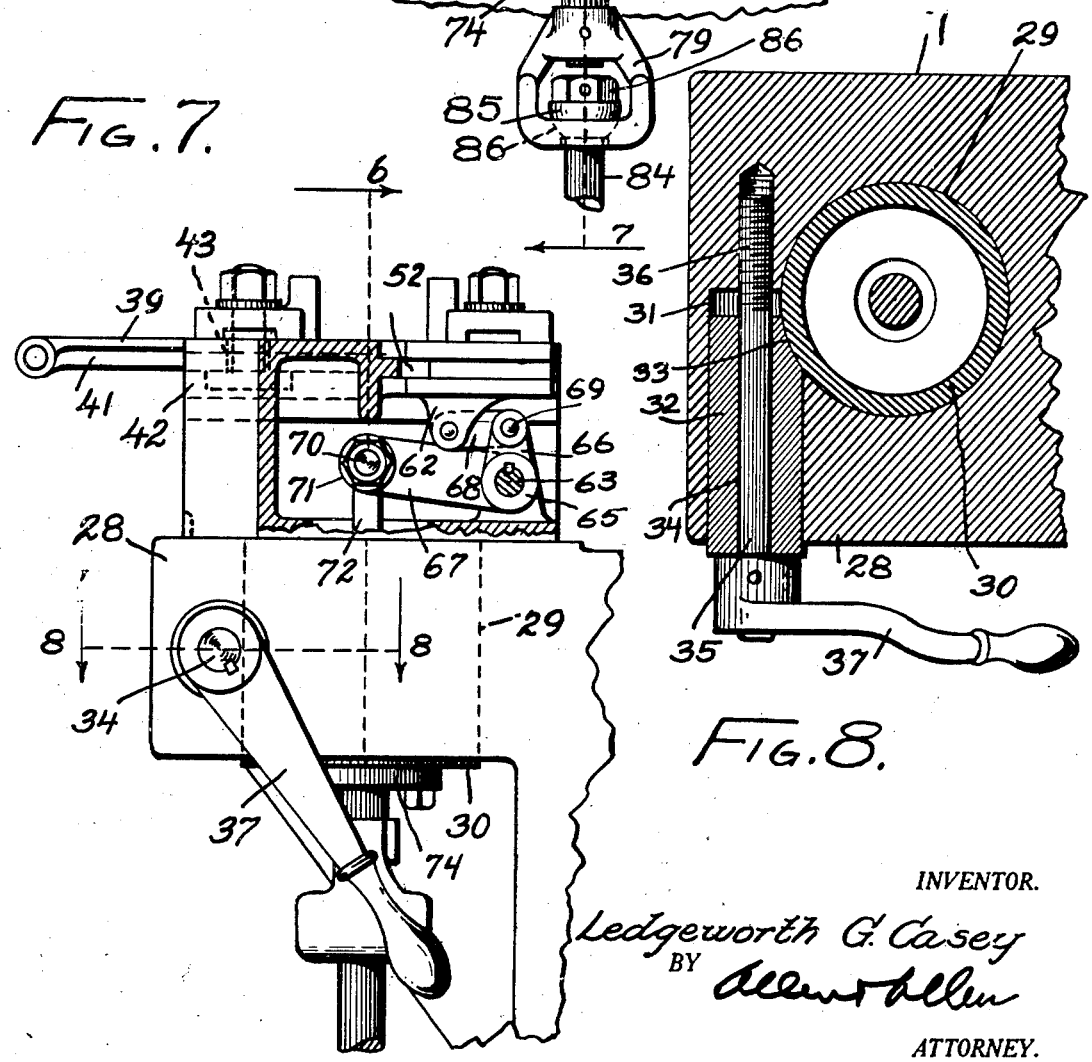
INVENTOR.
Ledgeworth G. Casey
BY
ATTORNEY.

Patented Oct. 30, 1934

1,979,140

UNITED STATES PATENT OFFICE 1,979,140

CUTTING-OFF MACHINE

Ledgeworth G. Casey, Cincinnati, Ohio, assignor to The Cincinnati Electrical Tool Company, Cincinnati, Ohio, a corporation of Ohio Application December 7, 1931, Serial No. 579,426

3 Claims. (Cl. 51—98)

My invention relates to devices for cutting bars or tubes of various cross sections, and of materials such as metal, fiber, bakelite and similar substances of a hardness and firmness permitting of precision cutting.

An object of my invention is to cut such articles with extreme accuracy and smoothness. A further object is to perform such cutting at various desired angles.

A further object is to perform such cutting by means of an abrasive periphery of exceptionally high velocity. A further object is to have the width of the cut at a minimum which will permit such high velocity cutting without an excessive use of power.

A further object is to provide for bringing the cutter and the work together with the greatest possible steadiness and accuracy not only in the interest of the accuracy with which the work is cut, but also on account of the extreme thinness of the cutting element and its high velocity, as well as the nature of its material necessary for permitting such high velocity to avoid breakage of this cutting element.

So far as I am aware, in cutting of materials by bringing thereagainst a thin periphery of high velocity, the material of the element doing the cutting has been one in which the inherent hardness of this material is depended upon for the cutting action, as well as for a reasonable length of life of the cutting element; such material, of course, usually being steel.

The difficulties attending the rotation of the metal element at such high velocities as I find desirable in carrying out my invention are such as to limit such devices to a low degree of efficiency. The safe limit of speed for a rotating element is for elements of the same specific gravity proportioned to the diameter of the element; and this limit may be varied only within a very short range by varying the shape or dimensions of the element. A simple thin disc of metal of course may be rotated much more rapidly than a fly-wheel for example, or an emery wheel where there is considerable weight of material at the periphery in proportion to strength of the material throughout the element.

My invention is based upon the principle that if a lighter material be employed which yet is fairly strong a high velocity is permissible; and further that if a material light enough for this requirement is employed, the material necessarily will be inherently too soft to form an efficient and durable cutting element; the principle of my invention thus further being expanded to include the carrying on such a soft element an abrasive surface of extreme hardness so that the advantages of hardness and very high velocity are attained together. A further principle of my invention which contributes to the advantage of lightness is the making of the element as thin as practicably is possible, which thinness has the further advantages of minimizing the waste of material being cut owing to the narrow cut taken, and also the reduction of power required to give such an element such high velocity; also because of the very narrow cut being taken.

Since the cutting element is very thin and also of a comparatively weak material it is highly necessary, especially because of its great speed, to bring it and the work together with practically no deviation from the required direction of feed, such as would twist or buckle the cutting element; and on account of this requirement my invention includes such a mounting of the means that carries and drives the cutting element and such a mounting of the means which holds the work, that the above damaging inaccuracies are avoided, and which construction at the same time contributes to the precision of cutting. My invention also includes provision for operating such reliable and accurate apparatus without the requirement as to any considerable skill on the part of the operator, and in such a manner that the cuts may be taken in rapid succession so that the machine, although working so accurately as to be rightly termed a precision machine, also is a production machine of great capacity.

In the drawings:

Fig. 3 is a plan view of the work-holding vise.

Fig. 4 is a plan view of the holding vise turned to its position for cutting stock at an angle of 45°.

Fig. 5 is a plan view of the table top showing the hole for mounting the stem of the vise and the angle markings thereon.

Fig. 6 is a longitudinal section of the vise and its operating mechanism, on the line 6—6 of Fig. 1.

Fig. 7 is a right hand elevation of the vise, parts appearing in section on the line 7—7 of Fig. 6.

Fig. 8 is a horizontal cross section on the line 8—8 of Fig. 6.

Figure 1:
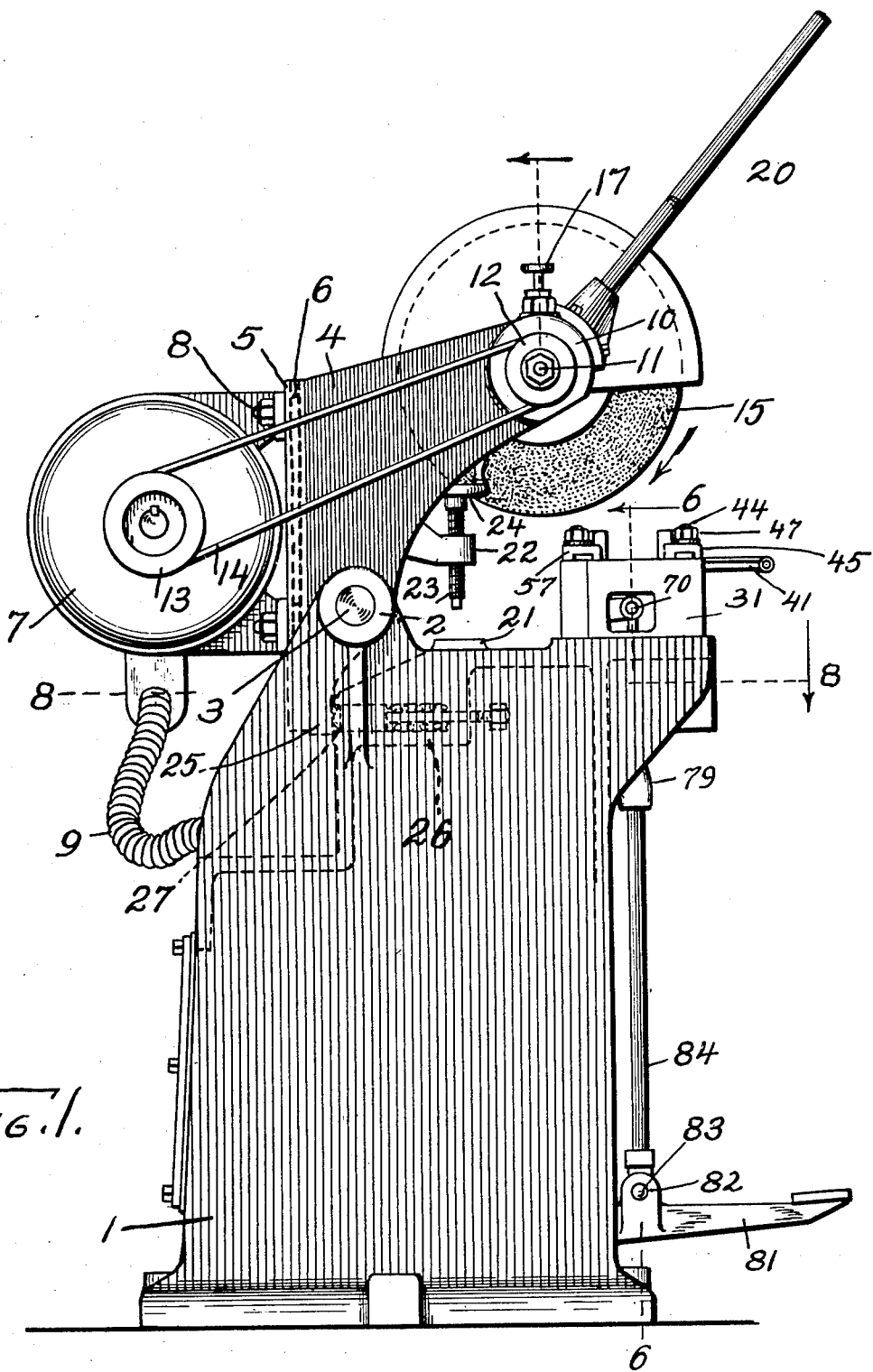
Figure 1 is an elevation showing the left hand side of a cutting-off machine, embodying my invention.

The base 1 of the machine has at its top a pair of bearings 2, on which is mounted, on a shaft 3, a housing 4, having on its rear a pair of vertical T slots 5 in which the heads of bolts 6 fit to hold an electric motor 7 to the rear of the housing 4, by means of nuts 8. Connected to motor 7 from a panel block in the base 1, is a flexible cable 9, long enough to allow an upward and downward movement of the motor 7 as the housing 4 is rocked on its bearings on shaft 3. The housing 4 has at its forward portion a long bearing housing 10 in which, mounted in roller bearings at each end, is a shaft 11, having on its left end a grooved pulley 12 in line with a second grooved pulley 13 on the shaft of motor 7. Passing over the pulleys 12 and 13 are V belts 14.

Mounted on the right hand end of shaft 11 is a thin abrasive cutting wheel 15, held on shaft 11 by the usual washers and nut common in the mounting of abrasive wheels. About midway of the length of shaft 11 is milled a key slot 16. Spring mounted in a housing is a plunger 17, having a shoulder 18 to limit its upward travel, and having a projecting portion 19 below shoulder 18.

When it is desired to remove the cutting wheel 15, by reason of wear or breakage, it is very difficult to prevent the shaft 11 from turning while trying to loosen the nut holding the cutting wheel 15. If plunger 17 be depressed and held depressed and shaft 11 turned, the projecting portion 19 of plunger 17 will enter slot 16 in the shaft 11 and lock the shaft against rotation and the removal of the cutting wheel becomes easy.

Mounted rigidly on housing 10 is a handle 20, this handle being the means for rocking the housing on its bearing, thus feeding the cutting wheel 15 to the stock to be cut. To regulate the exact depth of the cut, there is mounted on housing 4 a bracket 22, this bracket, at its outer end, having a threaded hole for an adjusting screw 23, which has at its upper end a hand wheel 24 for operating purposes. The base 1 has cast upon it a pad 21, against which the end of the adjusting screw 23 can strike when the housing 4 is rocked forward a sufficient distance.

Housing 4 is so balanced by the motor 7 that it always returns to its rear position. There is provided on housing 4 at its lower portion a depending lug 25. Mounted in a bearing 26 in base 1 is an adjustable spring-actuated plunger 27 adapted to be struck by the depending lug 25 and thus reduce any shock of the return of housing 4.

In the extended front portion 28 of base 1 is a large diameter hole 29, in which is mounted the stem 30 of a holding vise 31.

Drilled in the right hand side of extended portion 28 and partially cutting into the large diameter hole 29, is a hole 31, having mounted in it a bushing 32, this bushing having a portion of its inner end milled to a circular contour 33 of the same radius as the large hole 29. Bushing 32 has a central hole 34 for a rod 35, this rod having a threaded inner end 36 adapted to screw into the extended portion 28, the outer end of this rod having a handle 37.

With the stem 30 in hole 29, if the handle 37 be turned, the rod 35, screwing in extended portion 28, forces the bushing 32 inward, the circular portion of the bushing bearing against the stem 30 and clamping stem 30 and its vise in position in the hole 29 of the extended front portion 28. The vise may be set at any angle up to 45° from the transverse cutting line of wheel 15.

Mounted in the top and to the front of vise 31 (Fig. 3) is a pair of slides 38 and 39 of flat cross section with a longitudinal middle rib 41 (seen best in Fig. 6) extending downward into a slot 40 in the vise body. Below slot 40 is a transverse slot 42 of a greater width than slot 40. Each slide 38 or 39 has a hole 43 for a T-head bolt 44, the T-head of this bolt sliding in slot 42 and the bolt extending upward through slides 38 and 39. A pair of adjustable jaw members 45 and 46 are clamped to slides 38 and 39 by nuts 47 on the bolts 44, which pass through slots 48 in the jaw members 45 and 46. The slides 38 and 39 have forward extensions 49, which terminate in bosses 50, in which is secured a rod 51, thus tying the two slides together transversely so that they move as a unit in transverse adjustment.

Jaw member 45 has its left end square and its right end at an angle of 45° with its length, while jaw member 46 is square at both ends.

At the rear of vise 31 are front-to-rear dovetail slots 52 and 53 (Figs. 3, 6 and 7), in which are mounted respective slides 54 and 55, these slides having screwed in their upper faces studs 56. Mounted on these studs 56 are a second pair of jaw members 57 and 58 held in position by nuts 59 on the studs 56. The left hand jaw member 57 is square at both ends, while right hand jaw member 58 has its left hand end cut to a 45° angle, its right hand end being square.

Slides 38 and 39, as well as slides 54 and 55, have a longitudinal rib 60 projecting above their top surface, this rib acting as a guide for the two sets of jaw members and keeping them in parallelism at all adjustments. Rear slides 54 and 55 have integral with and projecting from their bottom surfaces, ears 61 and 62. Mounted longitudinally in bearings in the end walls of the vise body 31 is a shaft 63 (Figs. 6 and 7), having keyed thereto a pair of rocker arms 64 and 65, having at their outer ends respective upstanding ears 66 and at their inner ends respective forwardly extending arms 67.

The upstanding ears 66 are connected by links 68 and pins 69 to ears 61 on the rear slides 54 and 55. The forwardly extending arms 67 are connected together by a bolt 70 passing through an eye 71 on a rod member 72, which passes down through the hollow stem 30 of the vise body and terminates a short distance below the end of the stem in a yoke 79 for a swivel joint.

The stem 30 has a hole for the insertion of spring 73, this hole being closed by a plate 74, which acts as a shoulder for the spring and as a guide for rod member 72. Rod member 72 has a collar 75 near its upper end, which bears against spring 73, the spring thus tending, by reason of arms 66 and 67 and links 68, to hold rear jaw members 57 and 58 in a retracted position.

The vise body 31 has a central depressed surface 76, the rear right hand side of the depressed area having a wall 77 extending from near the center to the rear edge, this wall being at an angle of 45°. To the left of the center and to the rear of the center of the vise body depressed area 76, rises a wall 78 extending from the center of the vise to its rear edge.

Forwardly of the central longitudinal line of the vise body, the wall 77 continues to the front line of the vise body at a right angle to the central line of the body, while the continuation of wall 78 past the longitudinal center line to the front of the vise body is at an angle of 45°. The depressed area 76 is deeper at the rear of the longitudinal central line and grows shallower towards the front of the vise. The depressed area provides clearance for the cutting wheel either for straight or angular cutting, as will be seen in Figs. 3 and 4.

It is to be noted that jaw member 58 (Fig. 3) has secured to the under portion of its angular end a filler plate 80, this filler plate being held in position by screws 81.

Looking now at Fig. 3, it is to be noted that if short pieces of stock, that is pieces less than approximately one inch, were being cut, they would, by reason of the retreat of the angular wall 77, drop into the depressed area 76 and interfere with the cutting wheel and also be difficult of recovery, were not provision made for bridging the gap during straight cutting. Filler plate 80 is secured to jaw member 58 for this purpose. As will be seen by looking at Fig. 4, if the vise be set for angular cutting, the cutting line is close to wall 77 and no gap is present on the right of the line of cut, therefore when jaw 58 is moved to the right for angular cutting, the filler plate 80 is removed from the angle end of the jaw.

Figure 2:
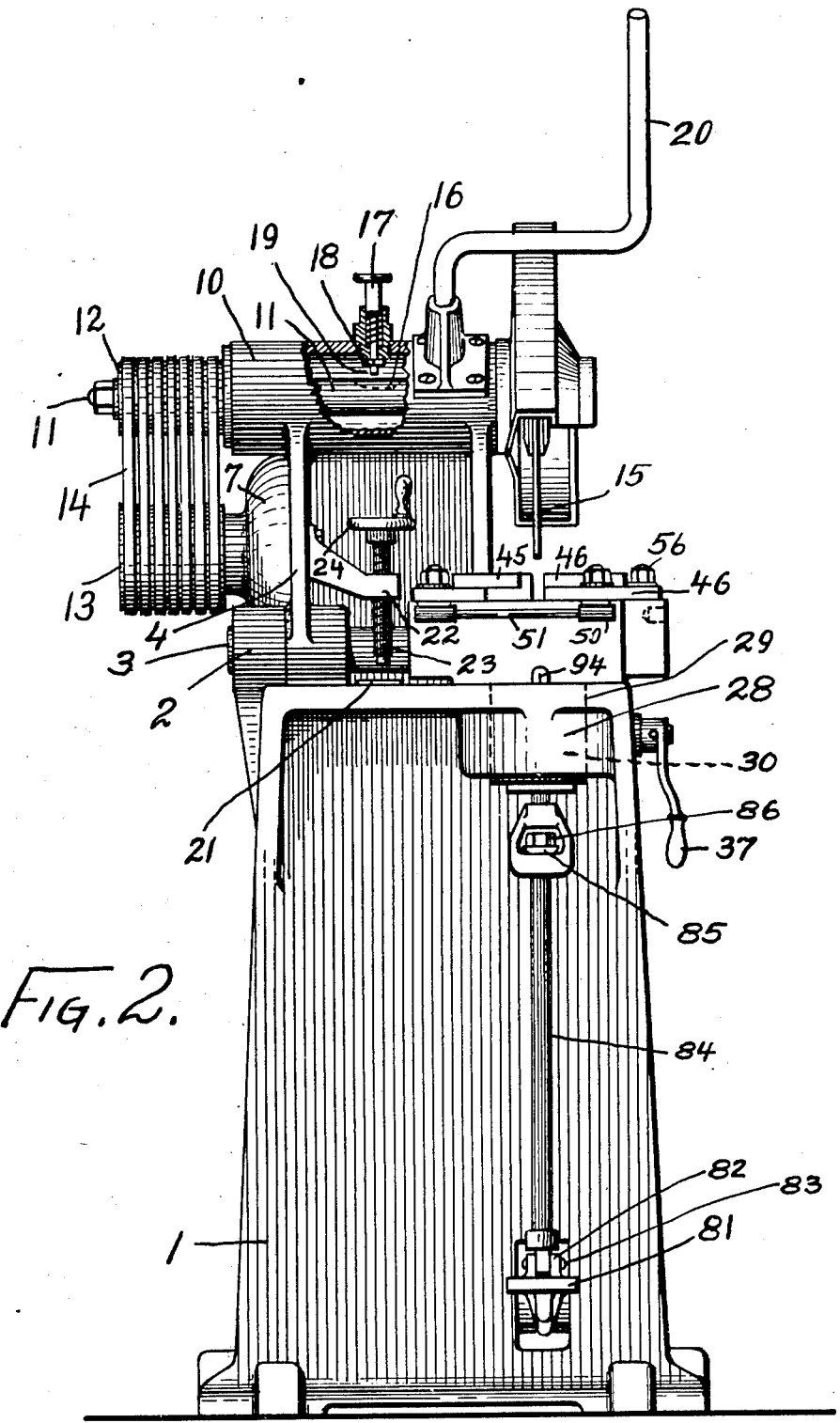
Fig. 2 is a front elevation of the same.

A foot treadle 81 (Figs. 1 and 2) is mounted in base 1 and projects outwardly therefrom. Near its rear end are a pair of ears 82 carrying a pivot 83, on which the lower end of connecting rod 84 is mounted; the upper end of the connecting rod 84 passing through a hole in the bottom of yoke 79 and having on its upper end a half ball 85 held in place by a nut 86, the half ball on the connecting rod seating in a socket 87 in the lower portion of yoke 79, thus forming a universal joint which permits the treadle to operate the vise, notwithstanding the movement of the vise to various angles to a transverse central line.

The operation of my cutting-off machine is as follows: For straight cutting the vise is in the position shown in Fig. 3. The jaw members 45 and 46 are adjusted inwardly until the stock to be cut is just free of the movable rear jaw members 57, 58. The jaw members 45 and 46 are also adjusted endwise to clear freely the cutting line of cutter wheel 15. This being done, the nuts 44 are tightened, clamping the jaw members 45 and 46 tightly in the correctly adjusted position. The stock is then clamped tightly between the front jaw members 45 and 46 and the rear movable jaw members 57 and 58 by the operator placing his foot on foot treadle 81 and moving the rear jaw members against the stock and gripping it tightly. The operator then pulls down on lever 20, rocking the housing 4, together with the cutting-off wheel 15, towards the stock, the wheel passing between the jaws and rapidly cutting off a portion of the stock. It is very essential that the stock be gripped close to the cutting line and on both sides of the cutting line to avoid breakage of the thin cutting-off wheel 15.

If it is desired to cut a quantity of stock to a given size, there is provided a gauge member. Screwed into the right hand end of vise body 31 is a rod 88, adjustably mounted on which is a support 89, clamped to rod 88 by a thumb nut 90, the upper portion of the clamp carrying a pivoted gauge member 91 adapted to be swung up out of the way on pivot 91.

If it be desired to cut stock at an angle, recourse is had to the degree scale 93 cut in the table top where the stem of the vise is seated. The angle having been decided upon, the handle 37 is turned to the left until the bushing 32 releases its grip on the stem 30 of the vise 31, whereupon the vise is turned to the right until index mark 94 (Fig. 2) on the vise body coincides with the selected degree mark 93 on the table top.

The handle 37 is then turned until bushing 32 again grips the stem of the vise 31, thus holding it in the selected position. The fixed forward jaws and their slides 38 and 39 are adjusted to the size of the stock and then the adjustable jaw members 45 and 46 are adjusted so as to clear the path of the cutter wheel 15 and secured in that position.

The rear movable jaws 57 and 58 are then adjusted longitudinally to clear the cutter wheel 15 and locked in position, the vise then being in the position shown in Fig. 4 if the cut be 45°, and the cut-off wheel is operated to cut the stock as has been described.

It is possible with my machine to cut a two-inch steel bar off in two seconds, and other sizes in proportionate time. Notwithstanding the high speed of cutting, it is found that the pieces on their cut surfaces are so perfectly plane that two such pieces will cling together under atmospheric pressure. This is mentioned as the best means of conveying an idea of just what kind of machine the present invention is concerned with. The cutting element 15 which I have used with the above degree of success is a combination of resinous condensation binder and silicon carbide abrasive throughout its structure, from 12 to 14 inches in diameter and 3/32 of an inch thick and running at a speed of 5200 R. P. M.

The specific statements made are for the purpose of fully disclosing a successful example of my invention, but it will be understood that modifications may occur in the formation or material of the cutting element, or the construction of the machine, as well as the mode of operation thereof, and that I do not wish to be understood as being limited to such precise disclosure, but what I claim as new and desire to secure by Letters Patent, is:—

1. In a cutting-off machine, in combination with a work holder and driving means, a rotatable disc of relatively low specific gravity and thickness, whereby said disc is safely rotatable at a substantially higher speed than a metal disc of like dimensions, at least the periphery of said disc presenting abrasive material, and means for causing relative approach of said disc and said work holder, said work holder comprising at least two jaws at each side of the work, the jaws at each side being arranged so that they are at opposite sides of the place of cutting of said disc, whereby the work is gripped at both sides of the cut, diagonally opposite jaws having their ends inclined to the length of the work, said jaws being mounted for adjustment in different positions relative to each other longitudinally of the work and to be rotated as a group relative to the plane of cutting of said disc and the inclined ends of said jaws permitting the relative approach of said work and said disc when the group of jaws and work are so rotated relatively to said plane of cutting.

2. In a cutting-off machine, a base, a work holder, rotatable on an axis at right angles to the direction of length of the work, cutting means movable to and from the work holder in a plane parallel with said axis, said work holder comprising a plurality of jaws to grip the work between them, a jaw at at least one side of the work being movable toward and from the work, operating means on said machine remote from said work holder, mechanism in said work holder for moving the movable jaw and an operative connection from said mechanism to said operating means comprising a swivel whereby said work holder may be rotated relatively to said operating means.

3. In a cutting-off machine, a base, a work holder on said base, a member having a pivot on said base whereby it rocks, said member comprising extensions in both directions from said pivot, a cutting disc journaled on one of said extensions, a motor mounted on the other extension, an operative connection between said motor and said cutting disc, an opening and closing work holder mounted on said base under said cutting disc and rotatable on said base on an axis at a substantial angle to that of the cutting disc, means at one side of the base for clamping said work holder in any one of a plurality of positions to which it may be rotated, operating means on said base remote from said work holder, and a swiveling operative connection between said operating means and said work holder for opening and closing said work holder while in any one of said positions.

LEDGEWORTH G. CASEY.